(12) United States Patent
Tate, Jr.

(10) Patent No.: US 11,048,835 B2
(45) Date of Patent: Jun. 29, 2021

(54) PROCESSING DATA TO CHARACTERIZE THE THERMAL BEHAVIOR OF A BATTERY

(71) Applicant: Dassault Systemes Simulia Corp., Johnston, RI (US)

(72) Inventor: Edward Dean Tate, Jr., Grand Blanc, MI (US)

(73) Assignee: Dassault Systemes Simulia Corp., Johnston, RI (US)

(*) Notice: Subject to any disclaimer, the term of this patent is extended or adjusted under 35 U.S.C. 154(b) by 85 days.

(21) Appl. No.: 15/443,155

(22) Filed: Feb. 27, 2017

(65) Prior Publication Data

US 2017/0249403 A1    Aug. 31, 2017

Related U.S. Application Data

(60) Provisional application No. 62/301,301, filed on Feb. 29, 2016.

(51) Int. Cl.

| *G06F 30/20* | (2020.01) |
|---|---|
| *G06F 17/13* | (2006.01) |
| *G06F 30/23* | (2020.01) |
| *G06F 111/10* | (2020.01) |
| *G06F 119/08* | (2020.01) |

(52) U.S. Cl.
CPC .............. *G06F 30/20* (2020.01); *G06F 17/13* (2013.01); *G06F 30/23* (2020.01); *G06F 2111/10* (2020.01); *G06F 2119/08* (2020.01)

(58) Field of Classification Search
CPC .......... G06F 30/20; G06F 30/23; G06F 17/13; G06F 2111/10; G06F 2119/08
See application file for complete search history.

(56) References Cited

U.S. PATENT DOCUMENTS

| 6,172,505 B1* | 1/2001 | Bertness | G01R 31/385 |
|---|---|---|---|
| | | | 324/430 |
| 9,207,285 B1* | 12/2015 | Swanton | G01R 31/392 |
| 2015/0157537 A1 | 6/2015 | Lanigan et al. | |
| 2016/0006087 A1* | 1/2016 | Lee | H01M 10/486 |
| | | | 429/62 |

OTHER PUBLICATIONS

Ying Shi et al., Discretization Methods for Battery Systems Modeling, Jun. 29, 2011, American Control Conference, 356-361 (Year: 2011).*

(Continued)

*Primary Examiner* — Omar F Fernandez Rivas
*Assistant Examiner* — Michael Edward Cocchi
(74) *Attorney, Agent, or Firm* — Fish & Richardson P.C.

(57) ABSTRACT

Methods, systems, and apparatus, including computer programs encoded on computer storage media, for the generation and use of a fast battery model. One of the methods includes obtaining temperature data for one or more locations within or on the surface of a battery, the temperature data comprising time-varying heat flow inputs applied to the battery and time-varying temperature signals generated by the battery. The method also includes processing the temperature data to generate a continuous-time thermal model having one or more time-delay elements and one or more parameters, wherein parameter values are fitted using the temperature data.

18 Claims, 5 Drawing Sheets

(56) References Cited

OTHER PUBLICATIONS

Ying Shi et al., Discretization Methods for Battery Systems Modeling, Jun. 29, 2011, American Control Conference, 356-361 (Year: 2011).*
P. Feldmann and R. W. Freund, "Efficient linear circuit analysis by Pade approximation via the Lanczos process," in IEEE Transactions on Computer-Aided Design of Integrated Circuits and Systems, vol. 14, No. 5, pp. 639-649, May 1995, (Year: 195).*
International Search Report and Written Opinion; PCT/US2017/19677; dated May 19, 2017; 8 pages.
EPO Extended European Search Report in EP Appln. No. 17760543.3, dated Jan. 7, 2019, 8 pages.
Muratori et al: "A Reduced-Order Model for the Thermal Dynamics of Li-Ion Battery Cells", Proceedings of the 6th IFAC Symposium Advances in Automotive Control, Munich, Jul. 12-14, 2010, vol. 43, No. 7, Jul. 2010, pp. 192-197.
Vajita, "Some remarks on Pade-approximations," 3rd Tempus-Intcom Symposium, Veszprem, Hungary, Sep. 9, 2000, pp. 1-6.
Van Mourik et al, "Physical parameter estimation in spatial heat transport models with an application to food storage", Biosystems Engineering, vol. 112, No. 1, Feb. 23, 2012, pp. 14-21.
"First Order Lag Filter," retrieved from https:://my.execpc.com/~steidl/robotics/first_order_lag_filter.html, Nov. 11, 2006, p. 1-2 (Last Modified: Nov. 11, 2006).
"Lead-Lag Filter," retrieved from https://www.mathworks.com/help/physmod/sps/powersys/ref/leadlagfilter, Oct. 15, 2020, 1 page (2013).
"Low-pass filter," Wikipedia, https://en.wikipedia.org/wiki/Low-pass_filter&oldid=978868244, Sep. 17, 2020, p. 1-6 (last edited on Sep. 17, 2020).
"What Is a Low Pass Filter? A Tutorial on the Basics of Passive RC Filters," Technical Article, retrieved from https://www.allaboutcircuits.com/technical-articles/low-pass-filter-tutorial, Oct. 15, 2020, p. 1-9 (May 12, 2019).

\* cited by examiner

PROCESSING DATA TO CHARACTERIZE THE THERMAL BEHAVIOR OF A BATTERY

CLAIM OF PRIORITY

This application claims priority to U.S. Patent Application Ser. No. 62/301,301, filed on Feb. 29, 2016, the entire contents of which are hereby incorporated by reference.

BACKGROUND

Batteries are an important component in consumer electronics and automobiles. One of the major contributors to battery life is the temperature of the battery. Higher temperatures reduce the life of the battery. However, high temperatures cannot always be avoided. For example, the temperature of a battery in an automobile may be a function of the heat generated by the engine.

SUMMARY

This specification describes technologies relating to batteries.

In general, one innovative aspect of the subject matter described in this specification can be embodied in methods that include, in aspect 1, the actions of obtaining temperature data for one or more locations within or on the surface of a battery, the temperature data comprising time-varying heat flow inputs applied to the battery and time-varying temperature signals generated by the battery. The method also includes the action of processing the temperature data to generate a continuous-time thermal model having one or more time-delay elements and one or more parameters, wherein parameter values are fitted using the temperature data.

The foregoing and other embodiments can each optionally include one or more of the following features, alone or in combination.

An aspect 2 according to any combination of aspects 1 and 3-17, wherein the continuous-time thermal model may be configured to predict battery thermal behavior for a plurality of heat flows.

An aspect 3 according to any combination of aspects 1-2 and 4-17, wherein a plurality of heat flows may each be applied to the boundary conditions or volumetric regions in the battery.

An aspect 4 according to any combination of aspects 1-3 and 5-17, wherein the continuous-time thermal model may include time delay elements and linear transfer function elements.

An aspect 5 according to any combination of aspects 1-4 and 6-17, wherein the temperature signals may be obtained from an experimental environment or from a simulation.

An aspect 6 according to any combination of aspects 1-5 and 7-17, wherein the continuous-time thermal model may be linearized at equilibrium.

An aspect 7 according to any combination of aspects 1-6 and 8-17, wherein the temperature signals may include data indicative of temperature and heat boundary conditions of a battery in a set of steady state conditions.

An aspect 8 according to any combination of aspects 1-7 and 9-17, wherein generating the continuous-flow thermal model may include minimizing the difference between the observed measurements match the steady state conditions measured.

An aspect 9 according to any combination of aspects 1-8 and 10-17, wherein the temperature signals may include data indicative of temperature and heat boundary conditions of a battery in a set of transient conditions which begin at the equilibrium condition.

An aspect 10 according to any combination of aspects 1-9 and 11-17, wherein the temperature signals may include a plurality of sets of transient measurements starting from the same battery equilibrium condition.

An aspect 11 according to any combination of aspects 1-10 and 12-17, wherein the time delay may be implemented using a Pade approximation with a different order for the numerator and denominator in a continuous time model.

An aspect 12 according to any combination of aspects 1-11 and 13-17, wherein the temperature signals may be generated using a simulation.

An aspect 13 according to any combination of aspects 1-12 and 14-17, wherein the temperature signals may be collected in a vehicle.

An aspect 14 according to any combination of aspects 1-13 and 15-17, wherein the temperature signals may be generated using a physical test stand.

An aspect 15 according to any combination of aspects 1-14 and 16-17, wherein the methods may further include the actions of determining if a battery thermal protection system is consistent with the model.

An aspect 16 according to any combination of aspects 1-15 and 17, wherein the simulation includes heat transfer between the battery and an external heat sink.

An aspect 17 according to any combination of aspects 1-16, where the simulation isolates the battery from all external heat sources and sinks.

Particular embodiments of the subject matter described in this specification can be implemented so as to realize one or more of the following advantages. Electro-thermal models for batteries can be efficiently produced. Batteries may be monitored and controlled using electronics using less processing power than required to manage and compute more complex equations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
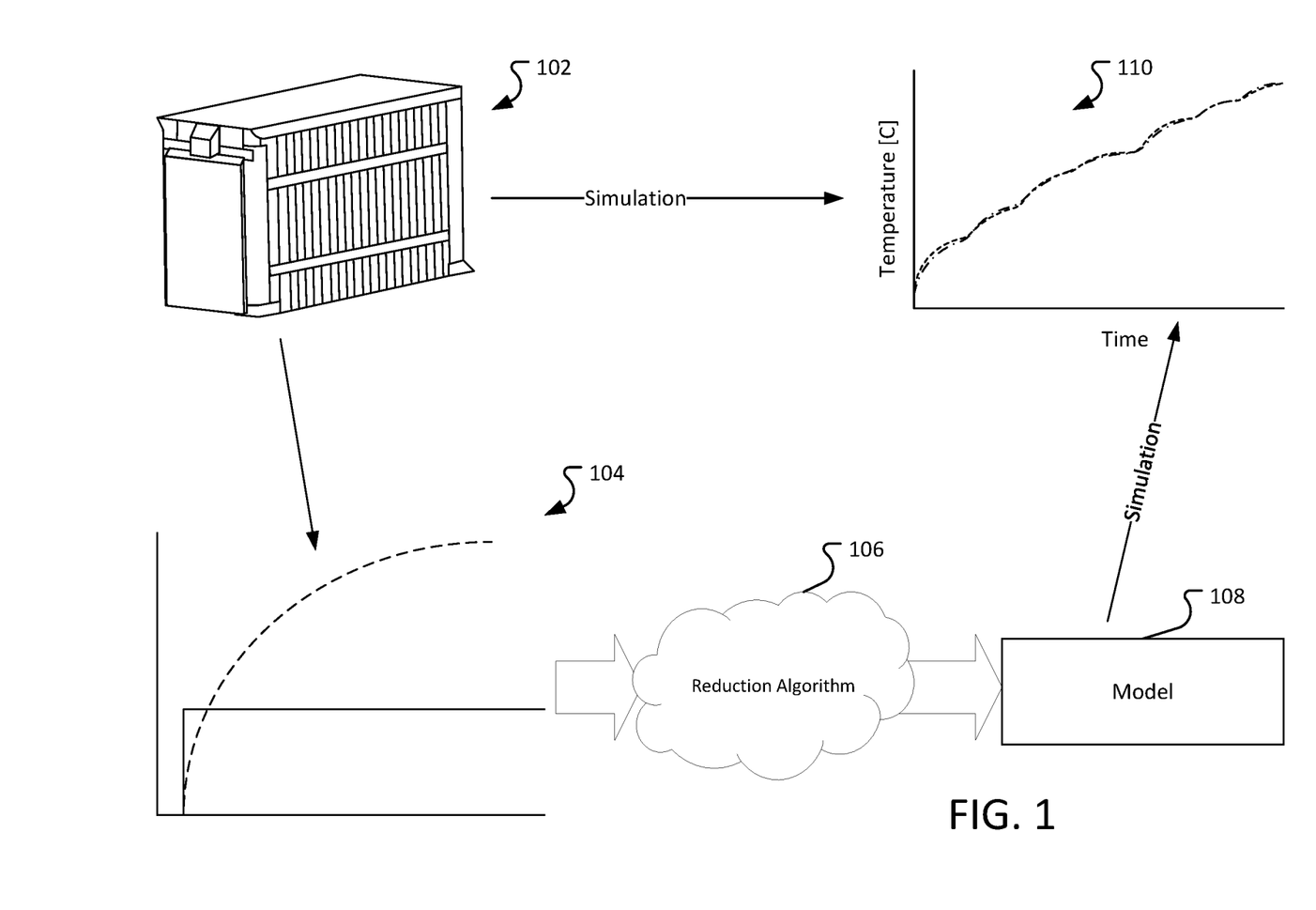
FIG. 1 illustrates an example of an environment for creating and verifying a fast battery model.

Fast, low complexity, models of a battery's thermal behavior can be used in the design and operation of a battery. A fast battery model can be generated using physical testing, in-situ operation, or 3D simulation. For example, FIG. 1 illustrates an example of an environment for creating and verifying a fast battery model. A battery or set of batteries may be tested in a thermally isolated environment 102. Data may be collected from the physical testing, in-situ operation, or 3D simulation.

The results of tests performed on the battery in the thermally isolated environment 102 can be recorded. For example, the step response(s) may be measured. The graph 104 illustrates the measured step-response curve, in which the solid line represents the boundary condition and the dotted line represents the measurement.

The measured responses may be used to generate a model. A reduction algorithm 106 can perform a fitting procedure for each step in the response curve. The fitted step response can be converted into equations. And the equations can be used in a model 108.

The model 108 can be used to simulate the expected thermal behavior of the battery. The results of the model based simulation can be compared to the testing results (or the effects of a more complex simulation), as represented by the graph 110. If the model 108 is sufficiently similar to the testing results then the model 108 can be integrated into different electronic devices, including, but not limited to, automobiles, mobile telephones, and tablets, A fast battery model (such as the model 108) can use a restricted set of basis functions, containing time-domain step responses of a time delay transfer function convolved with single time constant first-order filter, to match the response of a battery thermal model to a known input signal and create a low order dynamic model which executes with minimal computation which matching the responses of the thermal system to arbitrary inputs. The fitting can be performed using convex optimization. The fitting can be used to develop a single model for any set of measurements.

Figure 2:
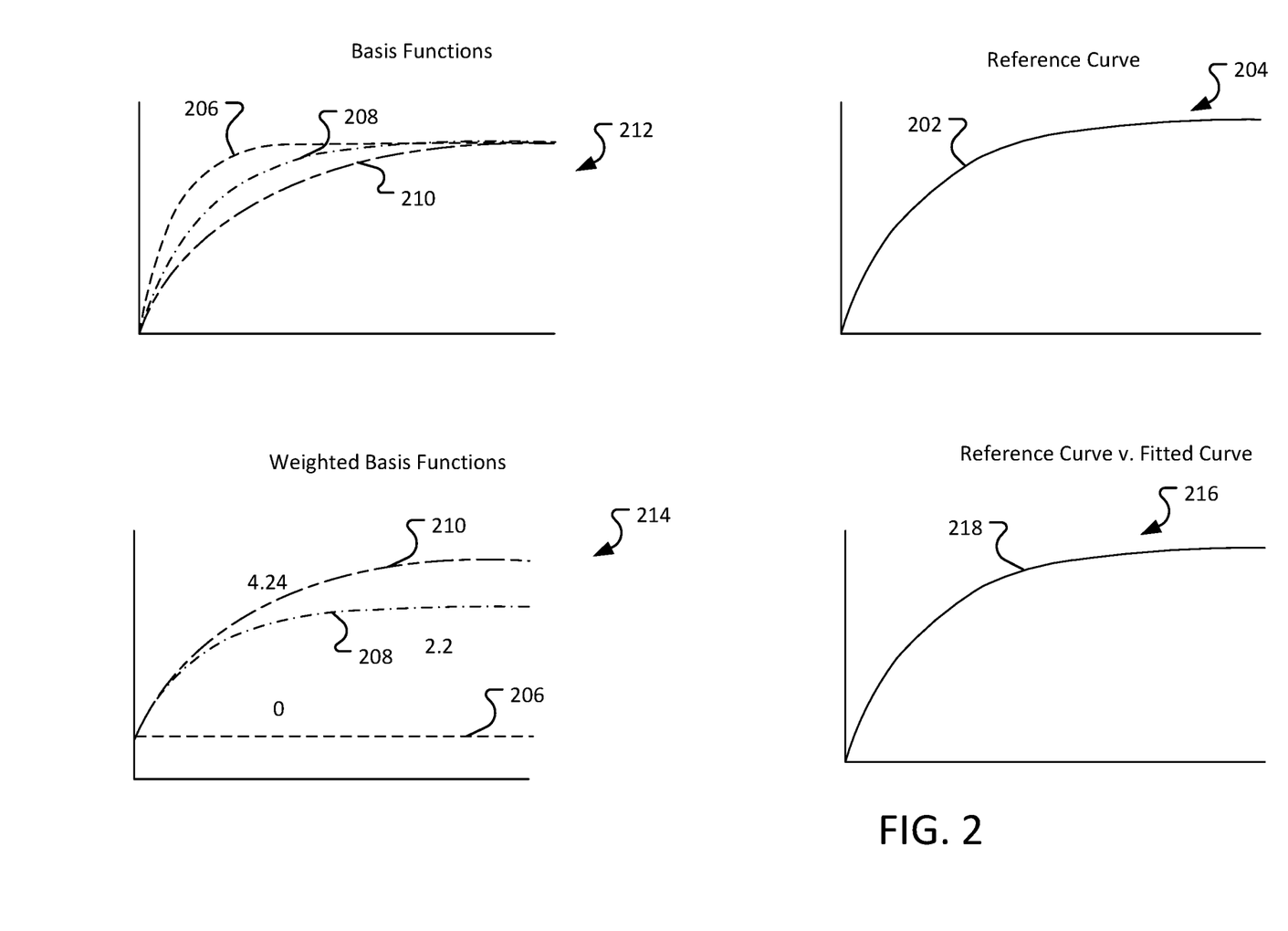
FIG. 2 illustrates an example of fitting basis functions to a model.

FIG. 2 illustrates an example of fitting basis functions to a model. A system can use a reference curve 202 as shown in graph 204 to build the model. The reference curve 202 can be obtained, for example, from measurements taken from experimental data, in situ testing, or simulations. The system can match a number of curves from basis functions (for example, basis functions 206, 208, 210, as shown in graph 212) to the reference curve 202, by applying a weight to each basis function. As shown in graph 214, the system applies a weight of 4.24 to basis function 210, a weight of 2.2 to basis function 208, and a weight of 0 to basis function 206. As shown in graph 216, the resulting curve 218 is an approximate match to the reference curve 202.

Figure 3:
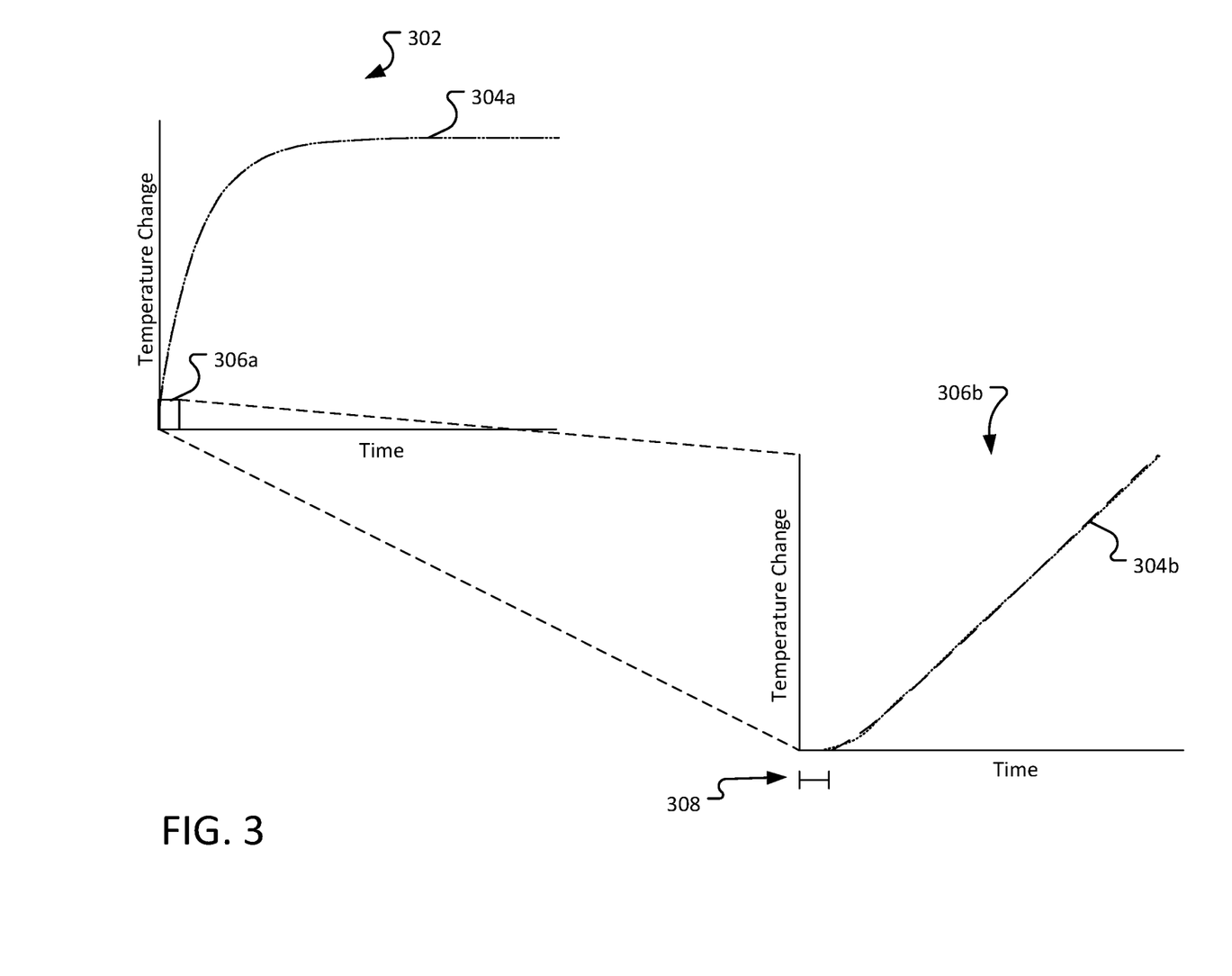
FIG. 3 illustrates an example of a time delay

FIG. 3 illustrates an example of a time delay. Thermal changes in the object may not occur instantly. Graph 302 illustrates an example of a line 304a that illustrates temperature over time for an object. Zooming into area 306a of the graph, graph 306b shows that the line 304b has a small delay 308 before the temperature of the object begins to change. This delay makes fitting basis functions difficult. Instead of trying to find basis functions to fit the delay, the system can insert a delay into the model so that the remainder of the line 304b is more easily fit using basis functions.

Figure 4:
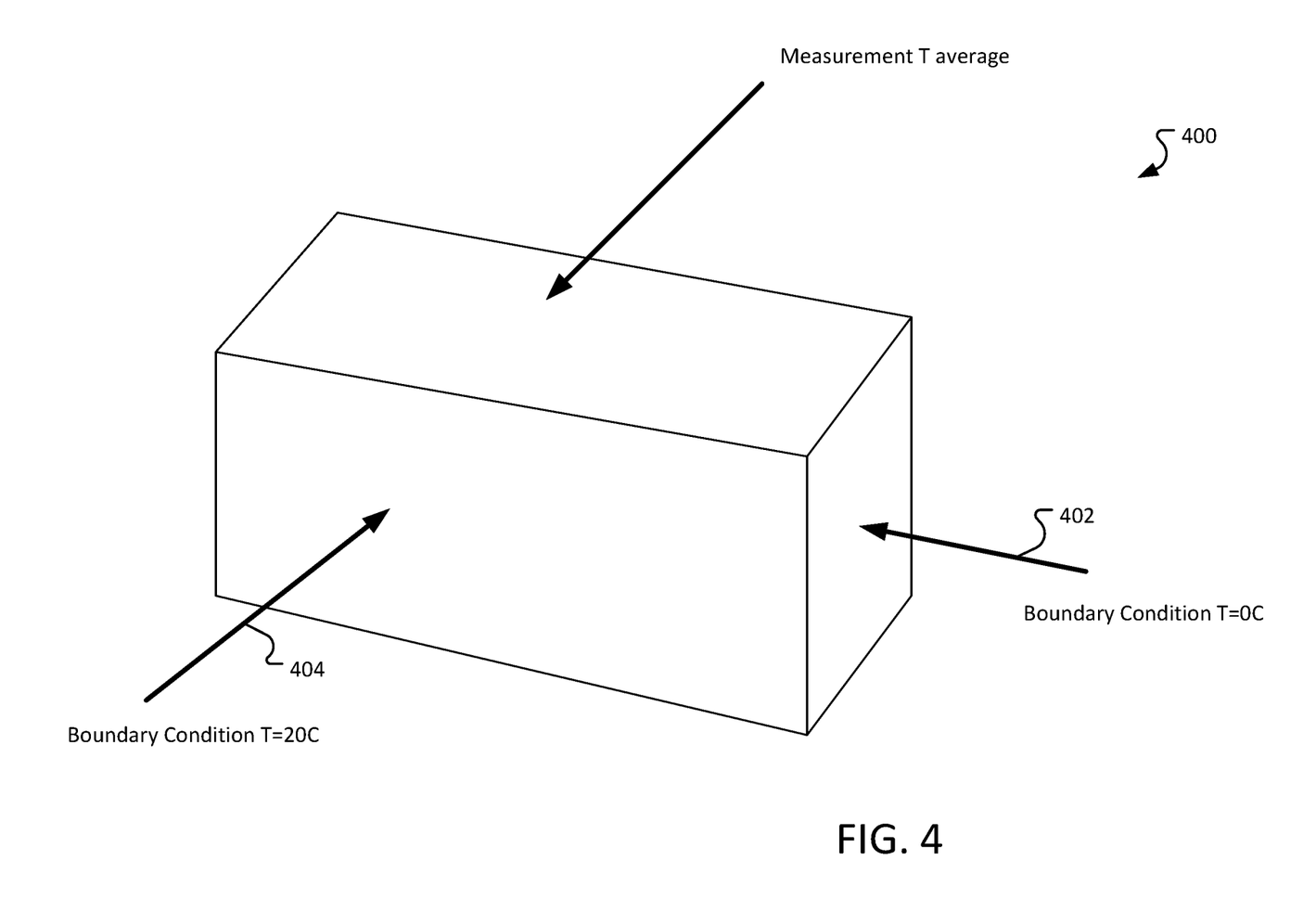
FIG. 4 illustrates an example test environment for a test environment for a three dimensional object.

FIG. 4 illustrates an example test environment 400 for a three dimensional object. The test environment may be physical or virtual. In this environment 400, boundary conditions such as temperatures and heat flows can be imposed on the object (for example, the temperature boundary condition T=0° C. 402 and the temperature boundary condition T=20° C. 404).

The temperature of the three dimensional object with internal heat generation obeys the heat equation:

$$\frac{\partial w}{\partial t} = \alpha \cdot \left( \frac{\partial^2 w}{\partial x^2} + \frac{\partial^2 w}{\partial y^2} + \frac{\partial^2 w}{\partial z^2} \right) + \frac{1}{c_p \cdot \rho} \cdot q \qquad \text{Equation 1}$$

In this equation, w is the temperature, q is the internal heat generation, $c_p$ is the heat capacity, $\rho$ is the mass density, and $\alpha$ is the thermal diffusivity defined by $$\alpha = \frac{k}{c_p \rho} \qquad \text{Equation 2}$$

In this equation, k is the thermal conductivity. To simulate these equations, various forms of discretization can be used. In general, where the equation coefficients are constant, the discretization will result a linear system of equations. On discretization scheme in continuous time can be represented by the function $$\frac{d}{dt} \begin{bmatrix} u_0 \\ u_1 \\ \vdots \end{bmatrix} = K \cdot \begin{bmatrix} u_0 \\ u_1 \\ \vdots \end{bmatrix} + B \cdot \begin{bmatrix} q_0 \\ q_1 \\ \vdots \end{bmatrix}, \qquad \text{Equation 3}$$

Where $u_i$ is the temperature of points in an object (for example, a battery) and K and B are created from the use of finite difference approximations. These equations are useful to develop a simulation of all of the temperatures in an object over time. However, this system of equations can be computationally expensive. In some application, all of the temperatures in Equation 3 are not necessary. These temperatures of interest can be selected by using an additional set of equations as shown in Equation 4.

$$\begin{bmatrix} T_0 \\ T_1 \\ \vdots \end{bmatrix} = C \cdot \begin{bmatrix} u_0 \\ u_1 \\ \vdots \end{bmatrix} \qquad \text{Equation 4}$$

When a subset of temperatures in an object needs to be simulated, an accurate simulation can be performed using fewer calculations than those implied by Equation 3 and Equation 4. One starting point to generate a faster, less complex reduced order model can be to recognize that Equation 3 and Equation 4 are a system of equations which are a set of linear, first-order ordinary differential equations. This form of equations is commonly referred to as a state space representation of a system. There are many approaches for reducing a state space models. A short list of approaches includes singular perturbation, pole and zero matching, removal of unobservable states, SVD decomposition and truncation, subspace methods, and many others. Additionally, there are multiple experimental approaches for building a model of a linear system from experimental data based on frequency and time domain responses of a system.

Figure 5:
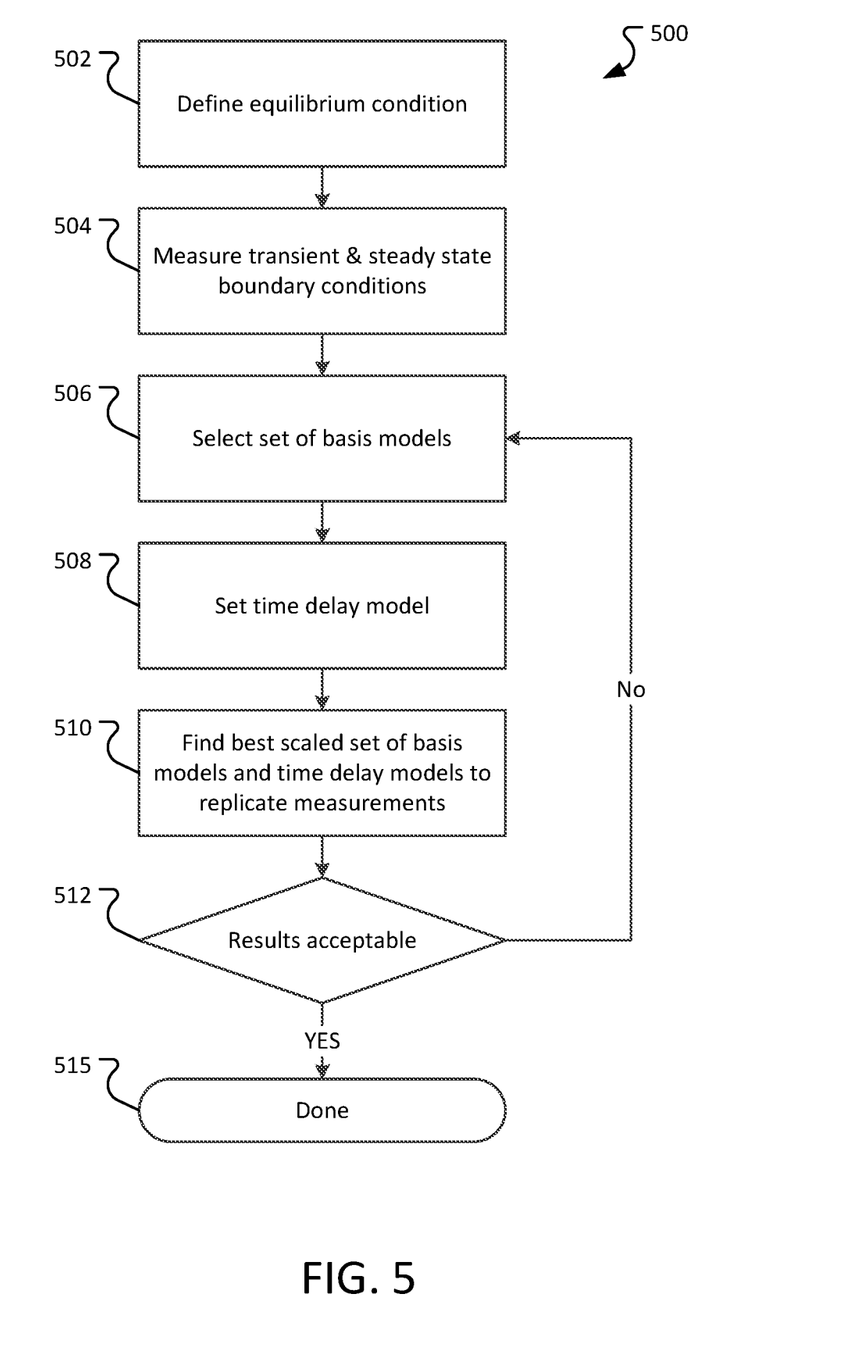
FIG. 5 illustrates an example process for generating a fast thermal model.

A stable, reduced order model can be generated from experimental or simulation data from an object subject to time varying and steady-state boundary conditions. FIG. 5 illustrates an example process 500 for generating a fast thermal model. To create the model, a state of the object in equilibrium can be identified 502. In this equilibrium state, the object may be at a constant temperature or subject to constant boundary conditions. The model developed can be linearized with respect to this equilibrium state: all input and output are assigned a value of zero at this equilibrium condition. The model replicates measurements taken on the object when subject to time varying boundary conditions 504. The time varying boundary conditions will be the inputs of the reduced order model. The measurements will be the outputs of the reduced model.

To create the reduced order model, a set of positive and linearly independent basis models are selected 506. A model can be a set of mathematical equations, which generate and output from an initial condition and a history of inputs. Models are linearly independent if the input to output behavior of one model cannot be replicated by a linear combination of other models in the set. A positive model is one which generates a positive steady state output when a positive steady state input is applied. In the preferred embodiment, the basis models are a finite set of first order lag filters with different time constants. An exemplary set of models is illustrated in Equation 5. In this example, S represents a set of K basis models of the form $\sigma_1, \sigma_2 \sigma_3 \ldots \sigma_k$. That is, each equation in S is identical in structure but differs by constants or parameters used in the equation. Expressed as a difference equation, $\sigma_k$, has a variable, $x_k$, and a parameter $\lambda_k$. Each basis model is represented by a dynamics equation, $f$, and an output equation, $g$. The basis models transform a time varying input, u, into a time varying output y. In this example, Equation 6 shows the use of a first order lag filter which is parameterized by $\lambda$. The parameters $\lambda_k$ are all unique, ensuring that the equations in S are linearly independent. In this example, the set of basis models are orthogonal if each $\lambda$ is unique. All equations in S share the input, u. The observed value is described by the equation g where $y_k$, the output, is equal to $X_k$ or ($g_k$: y=x). Each element in these vectors satisfies equation f where $f_k$: $\dot{x}=-\lambda_k \cdot x+u$.

$$S = \{\sigma_1, \sigma_2, \ldots, \sigma_K\} \quad \text{Equation 5}$$

$$\sigma_k = \left\{ \begin{array}{c} f_k: \dot{x} = -\lambda_k \cdot x + u \\ g_k: y = x \end{array} \right\} \quad \text{Equation 6}$$

Additionally, for each input and output to be modelled, a causal model of a time delay can be selected 508. In this example, this approximate time delay model can be expressed as a function of the desired time delay. One possible representation for an approximate time delay is the Pade approximation. An exemplary approximate time delay generated from a Pade approximation is shown in Equation 7. This Laplace domain transfer function had an equivalent state space system model.

$$T(s, \Delta t) = \frac{6720 - 2520(\Delta t \cdot s) + 360 \cdot (\Delta t \cdot s)^2 - 20 \cdot (\Delta t \cdot s)^3}{720 + 600(\Delta t \cdot s) + 240 \cdot (\Delta t \cdot s)^2 + 60 \cdot (\Delta t \cdot s)^3 + 10 \cdot (\Delta t \cdot s)^4 10 \cdot (\Delta t \cdot s)^5} \quad \text{Equation 7}$$

To generate inputs and outputs which can be used to generate the model, a set of input signals are obtained 510. The input signals may be generated by design or a result of using the object. In either case, the set of inputs may satisfy the following conditions. First, each input is linearly independent of the others. Second, the inputs are not a time shifted version of linear combination of other signals. This set of signals can be applied as the inputs affecting the boundary conditions on the object where the object is initially in the equilibrium state. While these time varying boundary conditions are applied, the outputs are measured. To generate the reduced model, input signals are applied to each basis model generating a set of state trajectories (for example, each input signal may be applied to each basis model), as shown in Equation 8. In equation 8, m indicates the input, k indicates the basis model from Equation 5, t represents the time instant, $u_m$ is the signal for input m, and $f_k$ is the dynamics equation from basis model k.

$$x_{m,k}(t) = \int_{\tau=0}^{t} f_k(x_{m,k}(\tau), u_m(\tau)) \cdot d\tau \quad \text{Equation 8}$$

These state trajectories can be used to generate the output trajectories as shown in Equation 9. In this equation, m indicates the input, k indicates the basis model from Equation 5, t represents the time instant, and $g_k$ is the output equation from basis model k.

$$y_{m,k}(t) = g_k(x_{m,k}(\tau), u_m(\tau)) \quad \text{Equation 9}$$

The reduced model can be formed by a linear combination of the basis models in Equation 5 where the inputs to each basis model are fed from the output of the time delay Equation 7. The linear combination can be formed by multiplying each basis model by a non-negative gain represented by $\kappa_{m,n,k}$ in Equation 10.

$$R_{m,n}(\kappa_{m,n}, \Delta t_{m,n}) = \left( \sum_k \kappa_{m,n,k} \cdot \sigma_k \otimes T(s, \Delta t_{m,n,k}) \right) \quad \text{Equation 10}$$

$$\hat{y}_n(\kappa_{m,n}, \Delta t_{m,n}, u_m) = \{y \mid y \text{ solves } R_{m,n}(\kappa_{m,n}, \Delta t_{m,n}) \quad \text{Equation 11}$$
with zero initial conditions, $u_m$ input}

A fast, reduced order model can be found by identifying values of $\kappa_{m,n,k}$ in Equation 10 and $\Delta t_{m,n}$ in Equation 11 which minimize the difference between $\hat{y}_n$ and measured data, minimize the number of non-zero value of $\kappa_{m,n,k}$, and match the steady state thermal behavior observed in various conditions. To simplify identifying values of $\kappa_{m,n,k}$ which best approximate the object's behavior observed behavior, an optimization problem similar to Equation 12 can be solved. As shown, the time delay associated with each input, output, and basis model along with the gain associated with each input, output, and basis model can be adjusted to minimize the result of a cost function, C, which quantifies the difference between measured and modeled temperatures. While Equation 12 illustrates one way to express and solve for the fast thermal model, other methods can be used to accomplish this goal.

$$\min_{\substack{\Delta t_{m,n,k} \\ \kappa_{m,n,k}}} C(\varepsilon) \quad \text{Equation 12}$$

subject to $$\varepsilon_n = \sum_m \hat{y}_n(\kappa_{m,n}, \Delta t_{m,n}, u_m) - y_n, \text{ for each output}$$

$$y_{n,l}^{ss} = \sum_m \hat{y}_n(\kappa_{m,n}, \Delta t_{m,n}, u_{m,l}^{uu})(t_{ss}),$$

for each output at each steady state condition number elements in $\{\kappa \mid \kappa_{m,n,k} \neq 0\} \leq K_{max}$ Once a thermal model is determined it can be determined if the results are acceptable 512. For example, do the results of the model correspond to the test or sample data within a predetermined margin of error. If the results are acceptable the process ends 515. If the results are not acceptable, a new set of basis models is selected 506.

Example Usage

As an example of the application of fast battery models, consider a battery thermal protection system that includes a liquid cooled battery pack, which are disposed in a vehicle that has a cooling system and charger. During the course of operation, this battery is thermally equalized. Once equalized, the thermal boundary conditions are measured or estimated. The cooling fluid and the charger are used to impose transient boundary conditions followed by steady state boundary conditions. As a simple case, these devices may generate step inputs to change the rejected heat in the battery and the coolant temperature. Given the apriori set of basis models in the optimization it can be used to find the best linear combination of basis models and time delays to replicate the measurements. Once this model is available, it may be used to affect the electrical usage of the battery or diagnose poor thermal performance.

Matching Poles and Zeros

In general, a thermal model of a battery behaves like a linear system. This means that about an operating condition, the temperature changes in response to heat input can be represented using transfer functions. A transfer function can be represented in the frequency domain and Laplace transforms. For example, a linear low pass filter can be described by $$T_{LP}(s) = \frac{a}{s+a}$$

The frequency response of this transfer function can be plotted by substituting $s=j\cdot\omega$, where $\omega=2\pi\cdot f$ and f is the frequency of the input. This function does not have a value of s where the transfer function has a value of 0. If $s=-a$, then this transfer function becomes a constant over 0, this is referred to as a pole.

For more complex transfer functions with polynomials on top and bottom, then the zeros are the roots of the numerator, and the poles are the roots of the denominator.

Since the poles and zero of a transfer function are the roots of the denominator and numerator, they uniquely identify the transfer function.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages, and it can be deployed in any form, including as a stand alone program or as a module, component, subroutine, service, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any kind of digital, analog or quantum computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., electronic, magnetic, magneto optical disks, or optical disks), however, a computer need not have such devices. Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non volatile memory, media and memory devices, including by way of example semiconductor memory devices (e.g., EPROM, EEPROM, and flash memory devices), magnetic disks (e.g., internal hard disks or removable disks), magneto optical disks, and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back end component (e.g., as a data server), a middleware component (e.g., an application server), or a front end component (e.g., a user computer having a graphical user interface or a Web browser through which a user can interact with an implementation of the subject matter described in this specification), or any combination of one or more such back end, middleware, or front end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a sub combination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for monitoring performance characteristics of a battery, the method comprising:

obtaining by a data processing system temperature data of one or more locations within or on the surface of a battery, the temperature data comprising time-varying heat flow inputs applied to the battery and temperature signals, with the temperature signals varying with time and being generated by the battery;

processing the temperature data through a reduced order thermal basis model that comprises a set of positive and linearly independent basis functions that have one or more time-delay elements and one or more parameters, with parameter values of the one or more parameters fitted to the set of basis functions using the obtained temperature data, and with the reduced order thermal basis model including a finite set of first order lag filters with different time constants to fit the time-delay elements of the set of basis functions;

wherein the reduced order thermal basis model is of the form $$S=\{\sigma_1, \sigma_2, \ldots, \sigma_K\}$$

where $\sigma_K$ is *a set* of $k$ basis models and is given by $$\sigma_k = \left\{ \begin{array}{c} f_k: \dot{x} = -\lambda_k \cdot x + u \\ g_k: y = x \end{array} \right\}$$

that is a first order lag filter parameterized by $\lambda k$: where $f_k$ is the dynamics equation, $\dot{x}$ is a time derivative, $g_k$: is an output equation, y is a time varying output and u is a time varying input; and diagnosing by the data processing system based on processing of the temperature data through the reduced order thermal basis model at least one of electrical usage and thermal performance of the battery.

2. The method of claim 1, wherein the thermal model is configured to produce a prediction of battery thermal behavior for a plurality of heat flows.

3. The method of claim 2, wherein the plurality of heat flows are each applied to boundary conditions or volumetric regions in the battery.

4. The method of claim 1, wherein the temperature signals are obtained from an experimental environment or from a simulation.

5. The method of claim 1, wherein the reduced order thermal basis model is linearized at equilibrium.

6. The method of claim 1, wherein the temperature signals comprise data indicative of temperature and heat boundary conditions of the battery in a set of steady state conditions.

7. The method of claim 6, wherein generating the thermal model comprises minimizing differences between the temperature signals and modelled temperatures of the battery under the set of steady state conditions.

8. The method of claim 1, wherein the temperature signals comprise data indicative of temperature and heat boundary conditions of the battery in a set of transient conditions at the equilibrium condition.

9. The method of claim 8, wherein the temperature signals comprise a plurality of sets of transient measurements starting from the same battery equilibrium condition.

10. The method of claim 1, wherein the time delay is implemented using a Pade approximation with a different order for the numerator and denominator.

11. The method of claim 1, wherein the temperature signals are obtained from a simulation.

12. The method of claim 11, wherein the simulation includes heat transfer at the boundary of the battery.

13. The method of claim 11, where the simulation isolates the battery from all external heat sources and sinks.

14. The method of claim 1, wherein the temperature signals are obtained from the battery in a vehicle.

15. The method of claim 1, wherein the temperature signals are generated using a physical test stand.

16. The method of claim 1, further comprising determining if a battery thermal protection system is consistent with the reduced order thermal basis model.

17. A system for monitoring performance characteristics of a battery, the system comprising:
a processor and a memory being configured to:
obtain temperature data for one or more locations within or on the surface of a battery, the temperature data comprising time-varying heat flow inputs applied to the battery and temperature signals, with the temperature signals varying with time and being generated by the battery;
process the temperature data through a reduced order thermal basis model that comprises a set of positive and linearly independent plural basis functions that have one or more time-delay elements and one or more parameters, with parameter values fitted to the set of basis functions using the obtained temperature data, and with the reduced order thermal basis model including a finite set of first order lag filters with different time constants to fit the time-delay elements of the set of basis functions;
wherein the reduced order thermal basis model is of the form
$$s=\{\sigma_1,\sigma_2,\ldots,\sigma_K\}$$
where $\sigma_K$ is a set of k basis models and is given by
$$\sigma_k = \left\{ \begin{array}{c} f_k: \dot{x} = -\lambda_k \cdot x + u \\ g_k: y = x \end{array} \right\}$$
that is a first order lag filter parameterized by $\lambda k$: where $f_k$ is the dynamics equation, $\dot{x}$ is a time derivative, $g_k$: is an output equation, y is a time varying output and u is a time varying input; and
diagnose by the data processing system based on processing of the temperature data through the thermal model at least one of electrical usage and thermal performance of the battery.

18. A non-transitory computer-readable data storage medium for monitoring performance characteristics of a battery, the medium storing computer-executable instructions that, when executed, cause a computer to:
obtain temperature data for one or more locations within or on the surface of a battery, the temperature data comprising time-varying heat flow inputs applied to the battery and temperature signals, with the temperature signals varying with time and being generated by the battery;
process the temperature data through a reduced order thermal basis model that comprises a set of positive and linearly independent plural basis functions that have one or more time-delay elements and one or more parameters, with parameter values fitted to the set of basis functions using the obtained temperature data, and with the reduced order thermal basis model including a finite set of first order lag filters with different time constants to fit the time-delay elements of the set of basis functions;
wherein the reduced order thermal basis model is of the form
$$s=\{\sigma_1,\sigma_2,\ldots,\sigma_K\}$$
where $\sigma_K$ is a set of k basis models and is given by
$$\sigma_k = \left\{ \begin{array}{c} f_k: \dot{x} = -\lambda_k \cdot x + u \\ g_k: y = x \end{array} \right\}$$
that is a first order lag filter parameterized by $\lambda k$: where $f_k$ is the dynamics equation, $\dot{x}$ is a time derivative, $g_k$: is an output equation, y is a time varying output and u is a time varying input; and
diagnose by the data processing system based on processing of the temperature data through the thermal model at least one of electrical usage and thermal performance of the battery.

* * * * *

UNITED STATES PATENT AND TRADEMARK OFFICE
CERTIFICATE OF CORRECTION

Page 1 of 1

PATENT NO. : 11,048,835 B2
APPLICATION NO. : 15/443155
DATED : June 29, 2021
INVENTOR(S) : Edward Dean Tate, Jr.

It is certified that error appears in the above-identified patent and that said Letters Patent is hereby corrected as shown below:

In the Claims

Column 10, Line 60, in Claim 1, delete "λk:" and insert --$\lambda_k$--;

Column 10, Line 61, in Claim 1, delete "gk:" and insert --$g_k$--;

Column 12, Line 6, in Claim 17, delete "s" and insert --$S$--;

Column 12, Line 14, in Claim 17, delete "λk:" and insert --$\lambda_k$--;

Column 12, Line 15, in Claim 17, delete "gk:" and insert --$g_k$--;

Column 12, Line 43, in Claim 18, delete "s" and insert --$S$--;

Column 12, Line 51, in Claim 18, delete "λk:" and insert --$\lambda_k$--;

Column 12, Line 52, in Claim 18, delete "gk:" and insert --$g_k$--.

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*